US012810573B2

(12) United States Patent
Lee et al.

(10) Patent No.: US 12,810,573 B2
(45) Date of Patent: Nov. 24, 2026

(54) ADAPTIVE THRESHOLDING FOR VIDEOS USING ARTIFICIAL INTELLIGENCE AND MACHINE LEARNING

(71) Applicant: Twelve Labs, Inc., Seattle, WA (US)

(72) Inventors: Seung Joon Lee, Seoul (KR); Raehyuk Jung, Seoul (KR); Haram Jo, Hwasun-gun (KR)

(73) Assignee: Twelve Labs, Inc., San Francisco, CA (US)

(*) Notice: Subject to any disclaimer, the term of this patent is extended or adjusted under 35 U.S.C. 154(b) by 284 days.

(21) Appl. No.: 18/227,661

(22) Filed: Jul. 28, 2023

(65) Prior Publication Data

US 2025/0037409 A1 Jan. 30, 2025

(51) Int. Cl.
*G06V 10/26* (2022.01)
*G06V 10/82* (2022.01)

(52) U.S. Cl.
CPC .............. *G06V 10/26* (2022.01); *G06V 10/82* (2022.01)

(58) Field of Classification Search
CPC ...... G06V 10/26; G06V 10/82; G06F 16/783; G06F 16/70; G06F 16/78; G06F 16/732; G06F 16/63; G06N 20/00
See application file for complete search history.

(56) References Cited

U.S. PATENT DOCUMENTS

2007/0263128 A1* 11/2007 Zhang .................... G11B 27/28 348/700
2008/0002771 A1* 1/2008 Chen .................... H04N 19/139 375/E7.146
2011/0196859 A1 8/2011 Mei et al.
2013/0142418 A1 6/2013 van Zwol et al.
2013/0259390 A1 10/2013 Dunlop et al.
2014/0270350 A1* 9/2014 Rodriguez-Serrano ...................... G06F 18/21 382/103
2016/0034786 A1 2/2016 Suri et al.
(Continued)

FOREIGN PATENT DOCUMENTS

CN 115359074 A * 11/2022 ........... G06V 10/761

OTHER PUBLICATIONS

PCT International Search Report and Written Opinion, PCT Application No. PCT/US24/32672, Sep. 30, 2024, pp. 1-13.
(Continued)

*Primary Examiner* — Stephen G Sherman
(74) *Attorney, Agent, or Firm* — Fenwick & West LLP

(57) ABSTRACT

A video analysis system trains and uses a machine-learned adaptive thresholding model configured to receive a query (e.g., text, image, video), and generate a predicted threshold value for a corresponding video retrieval model that indicates what value the filtering threshold should be for the query. The video analysis system filters video segments for the query that are associated with relevance scores above the predicted threshold generated by the adaptive thresholding model. In one instance, the adaptive thresholding model is configured as a machine-learned model, including neural networks, embedding models, transformer-based architectures, and the like that are capable of generating a predicted threshold value given a query that includes, for example, text, images, videos, audio, or any other appropriate data modality.

17 Claims, 6 Drawing Sheets

(56) References Cited

U.S. PATENT DOCUMENTS

| | | | |
|---|---|---|---|
| 2019/0294729 | A1 | 9/2019 | Jiang et al. |
| 2020/0279105 | A1 | 9/2020 | Muffat et al. |

OTHER PUBLICATIONS

Bogolin, S-V, et al., "Cross Modal Retrieval with Querybank Normalisation," Proceedings of the IEEE/CVF Conference on Computer Vision and Pattern Recognition (CVPR), 2022, pp. 5194-5205.

* cited by examiner

ADAPTIVE THRESHOLDING FOR VIDEOS USING ARTIFICIAL INTELLIGENCE AND MACHINE LEARNING

BACKGROUND

A video analysis system manages and analyzes a data store of videos. The video analysis system may perform various tasks, including query retrieval, analysis of the videos, and the like. Typically, a user of the video analysis system submits a query that is a request to identify and retrieve videos that are related to the query. For example, a user may submit a query to the video analysis system of "a guy in a red shirt playing tennis in a court" to request videos that include a man in a red shirt playing tennis in a court. The video analysis system performs a relevance analysis and identifies videos that include segments that relate to the query, for example, videos that includes a man in a red shirt playing tennis in a court.

In one instance, the video analysis system performs the relevance analysis by applying one or more machine-learned video retrieval models to the query and the stored videos that may include errors in the retrieval since it is a computer model. In particular, the video retrieval model may have discrepancy in accuracy when, for example, the content and complexity of the user queries are varied. Thus, there is a need to update the video retrieval model to take into account the content and complexity of queries when performing the relevance analysis, such that the video analysis system can retrieve videos with higher accuracy.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
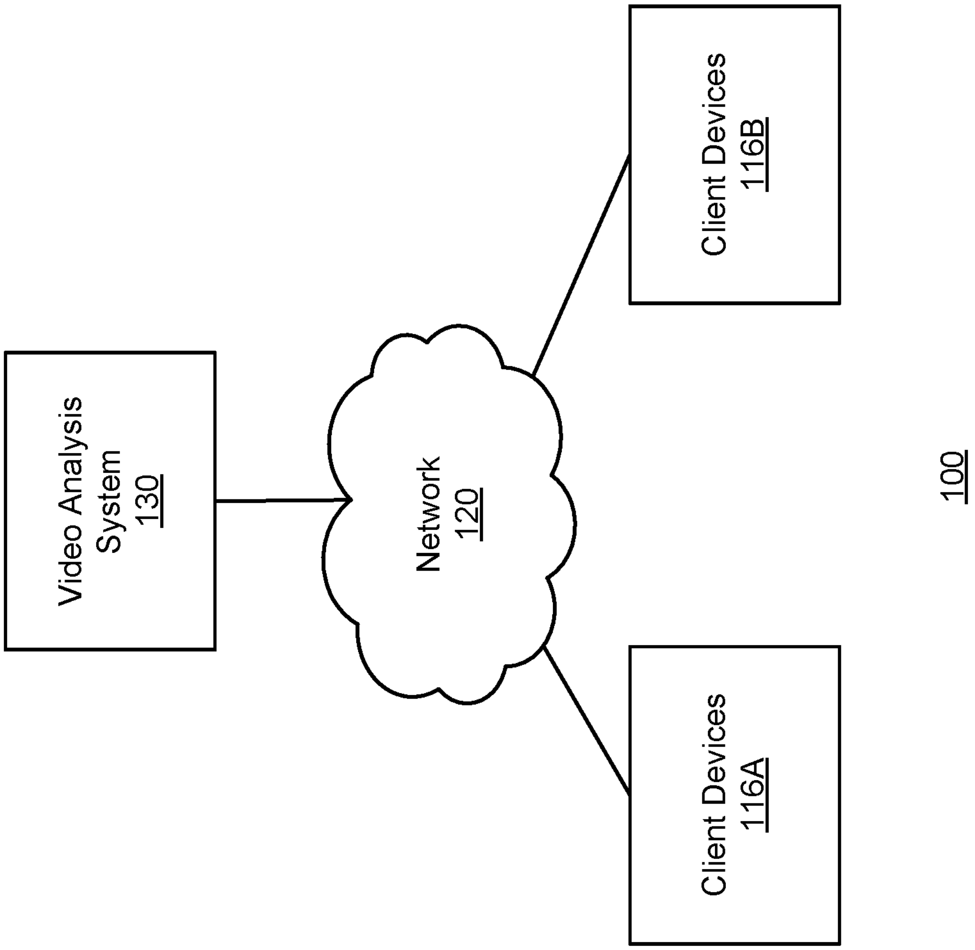
FIG. 1 is a high-level block diagram of a system environment for a video analysis system, in accordance with an embodiment.

FIG. 1 is a high-level block diagram of a system environment for a video analysis system 130, in accordance with an embodiment. The system environment 100 shown by FIG. 1 includes one or more client devices 116, a network 120, and a video analysis system 130. In alternative configurations, different and/or additional components may be included in the system environment 100.

The video analysis system 130 is system for providing various types of services related to videos to users of client devices 116A, 116B. For example, the video analysis system 130 may manage a collection of videos, where users of the video analysis system 130 can view, retrieve, and share videos managed by the video analysis system 130. The video analysis system 130 may have access to a significant number of videos that when analyzed, provides the video analysis system 130 with insight. For example, the video analysis system 130 may have access to a significant number of reviews by online users that when analyzed, provides the video analysis system 130 with insight into preferences of users.

The video analysis system 130 may receive requests from the client devices 116 to perform various types of tasks on the videos of the video analysis system 130. For example, the video analysis system 130 may perform sentiment classification on video reviews to identify positive or negative reviews for a video. Based on the classification results, the video analysis system 130 may also recommend videos to users associated with positive reviews. As another example, the video analysis system 130 may provide and present statistics on the videos.

In one embodiment, the video analysis system 130 receives one or more queries from users of client devices 116A, 116B. The request may include a query used by the video analysis system 130 to retrieve videos related to the query. For example, a user may submit a query to the video analysis system 130 to identify one or more videos of "a man in a red shirt playing tennis in a court." The video analysis system 130 performs relevance analysis to identify videos that are determined to include a man in a red shirt playing tennis in a court. In one instance, the query may include text data, image data, video data, audio data, and the like. The video analysis system 130 may present the identified videos or particular segments of the videos that are relevant to the query.

In one embodiment, the video analysis system 130 performs the relevance analysis by applying one or more machine-learned video retrieval models to the query and the videos managed by the video analysis system 130. Responsive to receiving a user query, the video analysis system 130 obtains one or more video segments from videos. A segment may be a portion or snippet of a video. In one instance, the video retrieval model is configured to receive a pair of the user query and a respective video segment and generate a relevance score for the pair that indicates how relevant the video segment is to the user query. However, it is appreciated that in other instances, the video retrieval model may generate relevance scores for multiple video segments simultaneously with one forward pass of the model, and/or the video retrieval model may include one or more models that are each used to generate the prediction score for a respective video segment.

In one instance, a high relevance score indicates that the video segment should be retrieved for the query with a high likelihood, and a low relevance score indicates that the video segment should likely not be retrieved for the query. For example, a high relevance score indicates that the video retrieval model identified the video segment as being highly relevant to the user query. For example, the video segment may include entities (e.g., objects, persons, scenery) specified in the query, characteristics described in the query, and the like. In one instance, as described in more detail below, the video retrieval model is configured as a machine-learned model, including neural networks, embedding models, transformer-based architectures, and the like that are capable of analyzing the query and a respective video segment to determine their relevance with one another.

In one embodiment, the video analysis system 130 identifies a set of video segments determined to be relevant to the user query by applying a predetermined threshold to the relevance scores of the video segments. In such an instance, video segments that have predicted relevance scores above the predetermined threshold are determined to be relevant and are provided as a response to the user. For example, a query may request to retrieve videos having video segments with "a car and a bicycle on the road." When the predicted relevance scores from the video retrieval model range from [0, 1], the predetermined threshold may be set as 0.3. The video analysis system 130 obtains segments of videos. For a pair including the query and a respective video segment, the video analysis system 130 applies the machine-learned video retrieval model to generate a relevance score for the pair that indicates how relevant the video segment is to the user query.

However, since the video retrieval model is machine-learned, errors may occur depending on the query and the predetermined threshold value set for selecting the video segments that are relevant to the query. In particular, the video retrieval model may have discrepancy in retrieval accuracy depending on the content and complexity of the user queries. For example, when the complexity of the query is relatively high (e.g., many objects or characteristics specified in the query), video segments that are relevant may be associated with a higher relevance score compared to a query that is relatively simple (e.g., few objects or characteristics specified in the query), because a higher degree of precision is required for the query.

Therefore, when the predetermined threshold is a relatively high value, the video analysis system 130 may filter out a relatively accurate group of video segments for complex queries, but identify a relatively inaccurate group of video segments for simpler queries because the predetermined threshold is too high to filter all video segments that are relevant to the simple query. Thus, there is a need to update the filtering threshold to take into account the content and complexity of queries when performing the relevance analysis, such that the video analysis system 130 can retrieve videos with higher accuracy.

Thus, in one embodiment, the video analysis system 130 trains and uses a machine-learned adaptive thresholding model configured to receive a query (e.g., text, image, video), and generate a predicted threshold value for a corresponding video retrieval model that indicates what value the filtering threshold should be for the query. The video analysis system 130 filters video segments for the query that are associated with relevance scores above the predicted threshold generated by the adaptive thresholding model. In one instance, the adaptive thresholding model is configured as a machine-learned model, including neural networks, embedding models, transformer-based architectures, and the like that are capable of generating a predicted threshold value given a query that includes, for example, text, images, videos, audio, or any other appropriate data modality.

Figure 2:
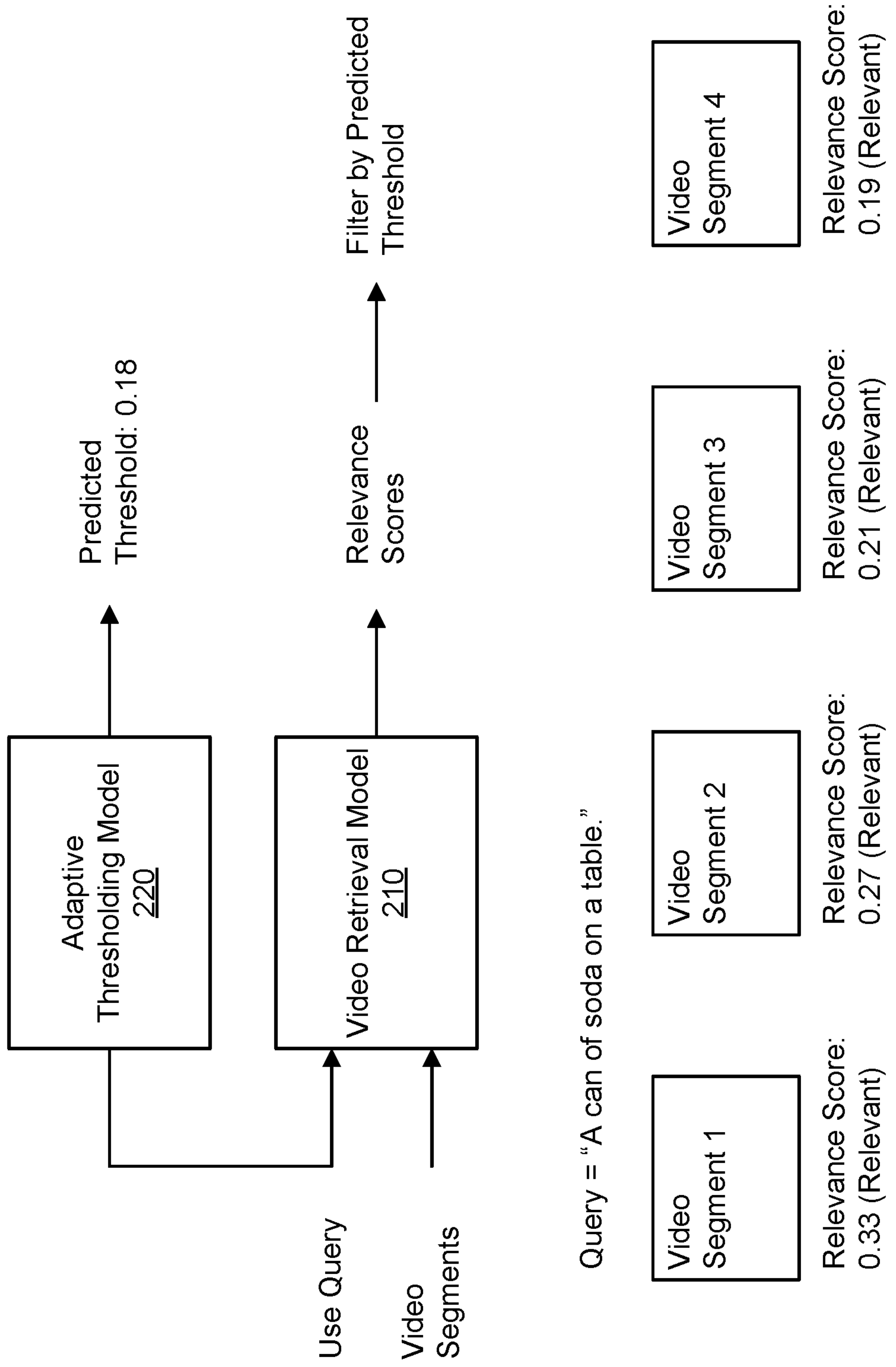
FIG. 2 illustrates an example inference process for retrieving videos using an adaptive thresholding model, in accordance with an embodiment.

FIG. 2 illustrates an example inference process for retrieving videos using an adaptive thresholding model 220 in conjunction with a video retrieval model 210, in accordance with an embodiment. The example in FIG. 2 assumes that the parameters of the adaptive thresholding model 220 and the video retrieval model 210 are trained via a training process described in more detail in conjunction with FIG. 3. As described in more detail below, in one embodiment, the video retrieval model 210 is trained using a training dataset including multiple instances of user query and video segment pairs and a corresponding label indicating whether the video segment is relevant to the query. The adaptive thresholding model 220 is trained using a training dataset including a user query and the relevance scores generated when the video retrieval model 210 are applied to pairs of the query and video segments that are determined to be positively relevant to the query.

Specifically, the video analysis system 130 receives a user query of "a can of soda on a table" requesting retrieval of videos or segments of videos that include a can of soda on a table. The video analysis system 130 obtains a set of video segments from videos. The video analysis system 130 applies a machine-learned video retrieval model 210 to each pair of the user query and a respective video segment to generate a relevance score for the video segment. As illustrated in FIG. 2, Video Segments 1 through 4 are segments that are relevant to the query (but is being determined or estimated by the video retrieval model 210). Video Segment 1 is assigned a relevance score of 0.33, Video Segment 2 is assigned a relevance score of 0.27, Video Segment 3 is assigned a relevance score of 0.21, and Video Segment 4 is assigned a relevance score of 0.19.

The video analysis system 130 also applies the adaptive thresholding model 220 to the query to generate a predicted threshold for the query. The predicted threshold value of 0.18 indicates that video segments having relevance scores equal to or above 0.18 should be filtered as being relevant to the user query. The video analysis system 130 filters video segments that are associated with relevance scores equal to or above the predicted threshold value of 0.18. All relevant Video Segments 1 through 4 are filtered in this process, resulting in an accurate relevance analysis. In contrast, if the threshold was a predetermined value of 0.3, the filtering process would result in only Video Segment 1 being determined as relevant, and would miss Video Segments 2 though 4 that are associated with lower relevance scores, resulting in increased error where relevant video segments are missed ("false negatives").

On the other hand, for another query with relatively high complexity, the ideal threshold value may be higher (e.g., 0.42) than the predetermined threshold value of 0.3 to detect a high portion of the video segments that are relevant to the query. In such an instance, the adaptive thresholding model 220 may generate a predicted threshold value of 0.42 to determine the video segments relevant to the query. If the video segments were filtered using the predetermined threshold value of 0.3, the filtering process would detect more video segments as being relevant than there actually are, resulting in increased error where irrelevant video segments are filtered with relevant video segments ("false positives").

Thus, by training and deploying the machine-learned adaptive thresholding model, the video analysis system 130 may adaptively and dynamically adjust the filtering threshold for selecting relevant videos that enable the video analysis system 130 to take into account the content and complexity of queries when determining which video segments are relevant. This allows the video analysis system 130 to reduce errors that may occur when the filtering threshold is kept at a static value regardless of the change in complexity and precision of the query.

Returning to the system environment 100 of FIG. 1, the client devices 116A, 116B are computing devices that display information to users and communicates user actions to the video analysis system 130. While two client devices 116A, 116B are illustrated in FIG. 1, in practice many client devices 116 may communicate with the video analysis system 130 in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the video analysis system 130. For example, a client device 116 executes a browser application to enable interaction between the client device 116 and the video analysis system 130 via the network 120. In another embodiment, the client device 116 interacts with the video analysis system 130 through an application programming interface (API) running on a native operating system of the client device 116, such as IOS® or ANDROID™.

The client device 116 allows users to perform various actions on the video analysis system 130. In one embodiment, users of client devices 116 can submit queries to the video analysis system 130 to retrieve video segments or videos that are relevant to the user query. For example, the client device 116 may generate an interface for the user to submit the query, and responsive to receiving the query from the user, provide the query to the video analysis system 130. In addition, responsive to receiving a response from the video analysis system 130 including a set of video segments or videos including those segments that are determined to be relevant to the query, the interface may present this information to the user.

Video Analysis System

Figure 3:
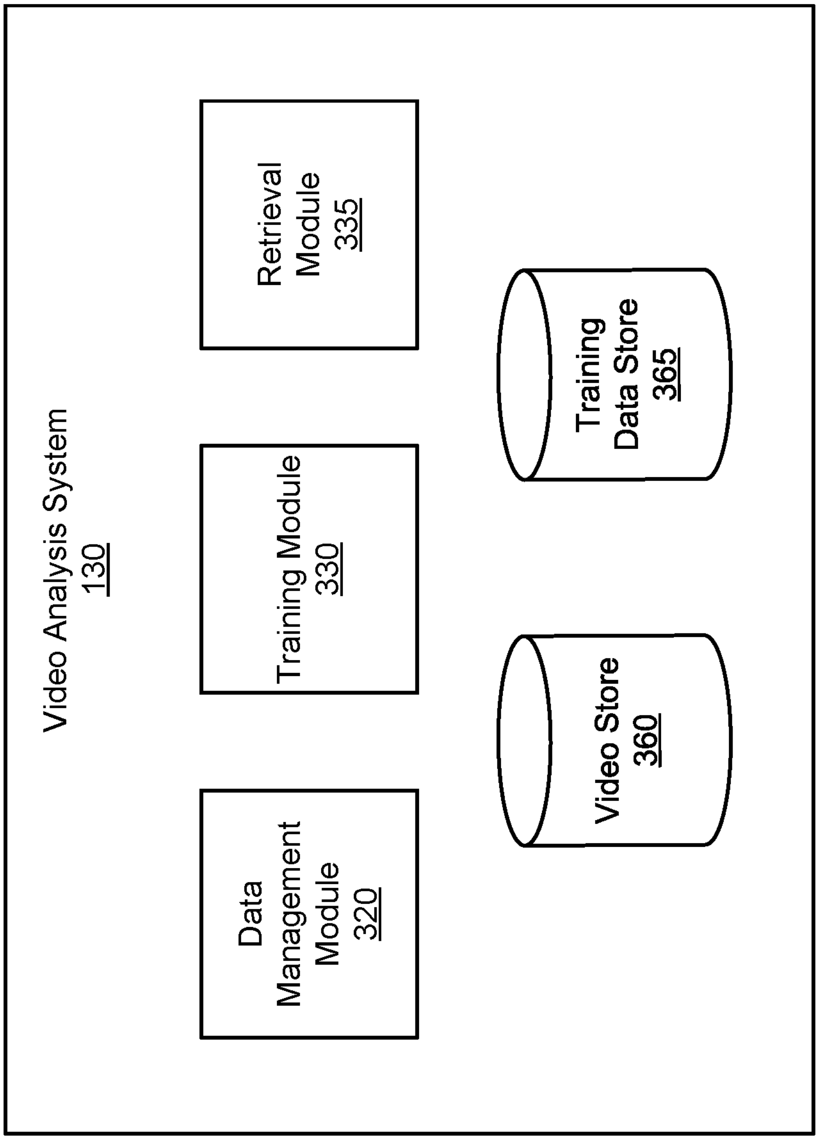
FIG. 3 is a block diagram of an architecture of a video analysis system, in accordance with an embodiment.

FIG. 3 is a block diagram of an architecture of a video analysis system, in accordance with an embodiment. In one embodiment, the video analysis system 130 may include components including a data management module 320, a training module 330, and a prediction module 335. The video analysis system 130 may also include a video store 360 and a training data store 365. However, it is appreciated that in other embodiments, the video analysis system 130 may include fewer or more components than that illustrated in FIG. 3.

The video store 360 is a storage system that includes a collection of videos. Each video may include a sequence of frames or images and encoding or decoding information for the video. In one embodiment, the video store 360 may be a local storage, but in other embodiments, may be stored on servers on a datacenter or cloud object storage associated with a virtual datacenter. In one embodiment, the videos of the video store 360 are indexed, such that features like title, description, a thumbnail image, a link to play the video, and metadata are stored in association with the video. Moreover, the indexing may mark one or more segments of the video that are each a collection of frames dedicated to, for example, the same scene, subject matter, and the like. Moreover, the videos may be stored based on the source of the videos across one or more datasets. As an example, a first collection of videos obtained from a video platform may be organized as Dataset A, a second collection of videos obtained from a website may be organized as Dataset B, and so on.

The data management module 320 manages the training data store 365 for storing training datasets used to train the video retrieval model and/or the adaptive thresholding model described in conjunction with FIGS. 1 and 2. In one embodiment, with respect to the video retrieval model, the training dataset may include one or more training instances, where a training instance includes a respective query and a set of labels for a set of video segments in a dataset. A label for a video segment indicates whether the video segment is relevant to the query (e.g., encoded with value of "1") or not (e.g., encoded with value of "0"). For example, for a Dataset A in the video store 360, the one or more training instances may include $(T_{A1}, V_{A1,1}, R_{A1,1}), \ldots, (T_{A1}, V_{A1,M}, R_{A1,M}), \ldots, (T_{AN}, V_{AN,1}, R_{AN,1}), \ldots, (T_{AN}, V_{AN,M}, R_{AN,M})$, where $T_{Ak}$ denotes a query for a k-th training instance obtained from Dataset A, $V_{Ak,j}$ denotes a j-th video segment in the set for the k-th training instance, and $R_{Ak,j}$ denotes a label indicating whether the j-th video segment is relevant to the query for the k-th training instance.

Moreover, the data management module 320 may encode the query, the video segments, and the corresponding labels into a numerical form (e.g., numerical vector) that can be processed by the video retrieval model. For example, the query may be mapped to a numerical embedding that represents the query, whether it is in the form of image, text, video, into a vector in the latent space. As another example, a video segment may be mapped to a numerical embedding that represents the video segment in the latent space.

In one embodiment, the data management module 320 further augments the training dataset by extracting augmented queries from the existing queries in the dataset and associating the augmented queries with video segments that are relevant to the original existing query. In particular, an augmented query derived from an existing query describes a subset of objects, persons, entities that can be inferred from the existing query. For example, the text for a query $T_{A1}$ may be "A person in a mascot uniform trying to maneuver a bouncy house." From the query, the data management module 320 or a human operator can infer example augmented queries $T_{A1,aug1}$="person," because a person would be included in video segments that are relevant to query $T_{A1}$, $T_{A1,aug2}$="person in mascot uniform," because a person in a mascot uniform would be included in video segments that are relevant to query $T_{A1}$, and $T_{A1,aug3}$="tall person," because a tall person would most likely maneuver the bouncy house. For an example relevant video segment $V_{A1,1}$ that is relevant to query $T_{A1}$ (and therefore $R_{A1,1}$="1"), the data management module 320 may augment the training dataset by creating training instances $(T_{A1,aug1}, V_{A1,1}, R_{A1,1})$, $(T_{A1,aug2}, V_{A1,1}, R_{A1,1})$, and $(T_{A1,aug3}, V_{A1,1}, R_{A1,1})$.

The data management module 320 may provide the training dataset for the video retrieval model to the training module 330, such that the video retrieval model is trained based on the training dataset including any augmented training instances. In one embodiment, with respect to the adaptive thresholding model, the training dataset also includes one or more training instances. A training instance for the adaptive thresholding model includes a respective query and a relevance score for the query generated by the trained video retrieval model when applied to the query and a respective video segment determined to be relevant for the query. For example, the training instances from Dataset A may be represented as $(T_{Ak}, R'(T_{Ak}, V_{Ak,j}))$, $j \in S$ where $R'(T_{Ak}, V_{Ak,j})$ denotes the relevance score generated for the k-th query $T_{Ak}$ and a video segment $V_{Ak,j}$ where j denotes a segment in the set S of video segments that are known to be relevant to the query. The training dataset for the adaptive thresholding model may also include instances generated from augmented queries.

The training module 330 trains one or more machine-learned models for the video analysis system 130. In one embodiment, the training module 330 trains the video retrieval model using the training dataset generated by the data management module 320. In one instance, the training module 330 trains the parameters of the video retrieval model by iteratively repeating a forward pass step and a backpropagation step. During the forward pass step, the training module 330 applies the video retrieval model to the query and video segment pair ($T_{Ak}$, $V_{Ak,j}$) for multiple instances in the training dataset to generate estimated relevance scores. The training module 330 computes a loss function indicating a difference between the estimated relevance scores and the known labels $R_{Ak,j}$ for the training instances. The training module 330 performs the backpropagation step to update the parameters of the video retrieval model. This process is repeated until a convergence criterion is reached.

In one embodiment, responsive to receiving a request from the data management module 320, the training module 330 generates a set of relevance scores for a query and one or more video segments that can be used to generate the training dataset for training the adaptive thresholding model. For example, the training module 330 may generate a set of relevance scores by applying the trained video retrieval model to a query and one or more video segments that are known to be relevant to the query in a given dataset, as described in conjunction with the data management module 320. The training module 330 may provide the relevance scores to the data management module 320.

Figure 4:
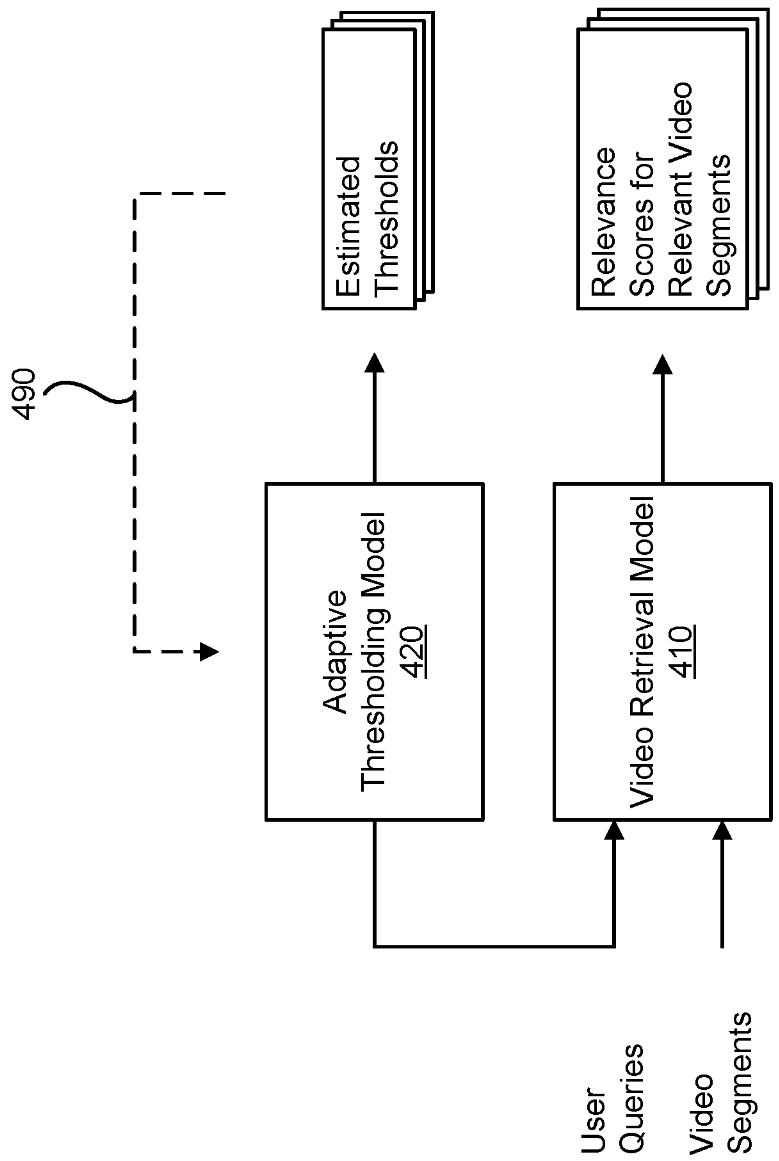
FIG. 4 illustrates an example training process for an adaptive thresholding model, in accordance with an embodiment.

FIG. 4 illustrates an example training process for an adaptive thresholding model 420, in accordance with an embodiment. As described above, the training module 330 applies the trained video retrieval model 410 to generate relevance scores for a user query and video segments known to be relevant to the user query and provides the relevance scores to the data management module 320 such that the training instances for the adaptive thresholding model 420 can be generated. After, the training module 330 trains the adaptive thresholding model 420 using the training dataset.

During the forward pass step, the training module 330 applies the adaptive thresholding model 420 to the query of each training instance to generate an estimated threshold value for the instance. The training module 330 computes a loss function 490 indicating a difference between the estimated thresholds and the relevance scores $R'(T_{Ak}, V_{Ak,j})$ for the training instances. The training module 330 performs the backpropagation step to update the parameters of the adaptive thresholding model 420. This process is repeated until a convergence criterion is reached. In this manner, for a given query, the adaptive thresholding model 420 is trained to predict a filtering threshold that likely corresponds to relevance scores for video segments that are determined to be relevant to the query.

As described in conjunction with FIGS. 1 and 2 above, the adaptive thresholding model can be configured as neural networks, embedding models, transformer-based architectures, and the like that are capable of generating a predicted threshold value given a query. In one embodiment, the adaptive thresholding model 420 is configured as a bidirectional encoding representations from transformers (BERT) architecture, in which the outputs of the transformer architecture represent the query as a series of output embeddings. A classification or regressor model can be appended to the transformer architecture that is configured to receive a classification output token and generate the predicted threshold value.

Figure 5:
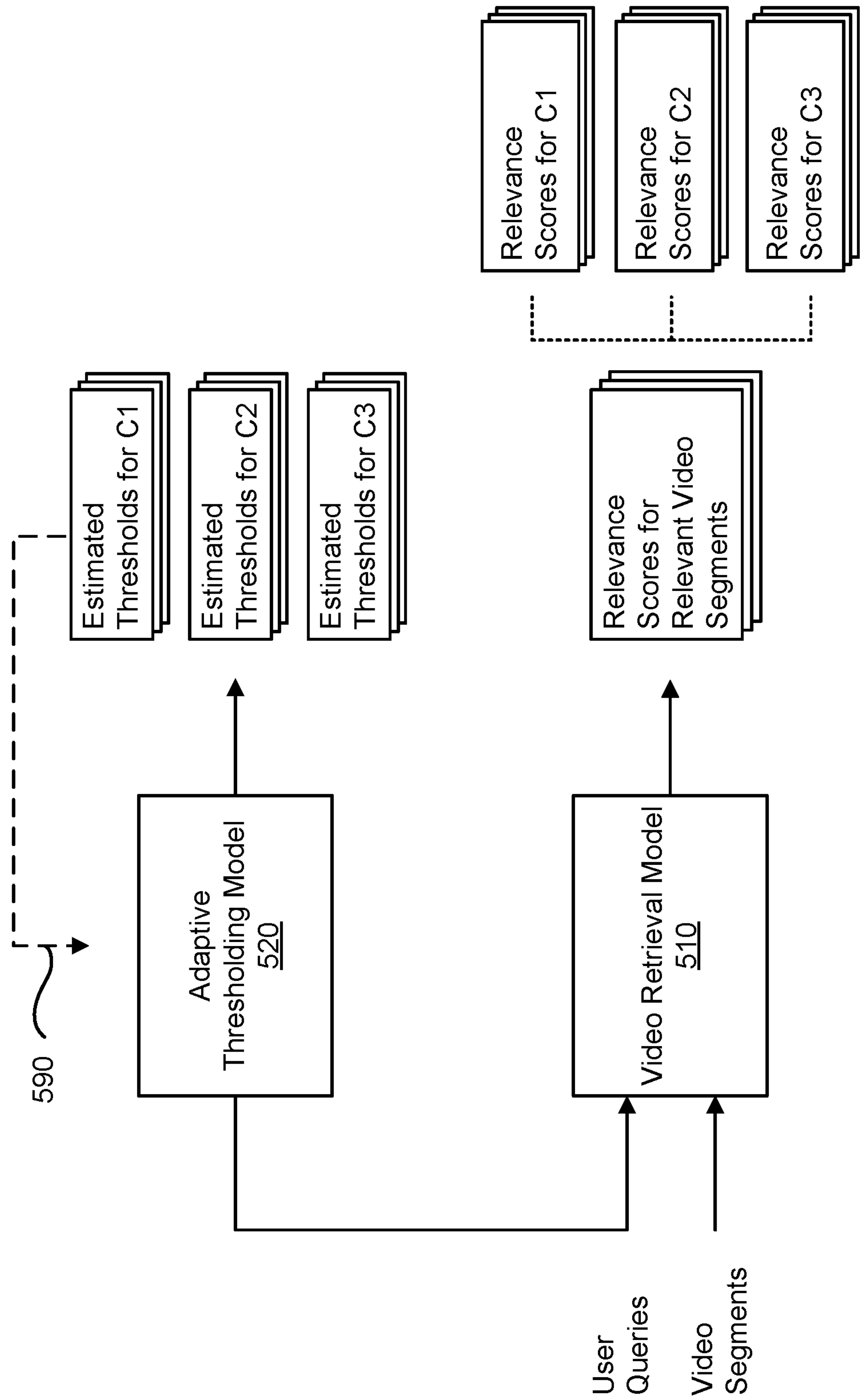
FIG. 5 illustrates an example training process for an adaptive thresholding model, in accordance with another embodiment.

FIG. 5 illustrates an example training process for an adaptive thresholding model 520, in accordance with an embodiment. In yet another embodiment, the adaptive thresholding model 520 is trained to output one or more predicted thresholds that each correspond to varying performance metrics. For example, the adaptive thresholding model may be configured to predict one or more filtering thresholds that each target a respective performance metric for retrieval. In one instance, the performance metrics may include precision or recall. Specifically, the precision metric may refer to a ratio or percentage that indicates of all video segments determined to be relevant, how many video segments are correctly identified as positive. The recall metric may refer to a ratio or percentage that indicates of all relevant video segments, how many video segments are predicted to be relevant by the video retrieval model.

In such an embodiment, the data management module 320 may further generate a training dataset for such an adaptive thresholding model including one or more training instances. A training instance for the adaptive thresholding model 520 includes a respective query and one or more relevance scores for the user query that each correspond to a respective performance metric. In one instance, the relevance score for a respective performance metric (e.g., recall level at 0.7) is generated by applying the trained video retrieval model 510 to video segments of a dataset, and identifying a relevance score that results in the desired performance metric when video segments are filtered according to the relevance score.

For example, in FIG. 5, the training instances from Dataset A may be represented as ($T_{Ak}$, $R'_{C1}$, $R'_{C2}$, $R'_{C3}$), when there are three desired performance metrics. As an example, performance metric C1 may correspond to a precision metric at 0.9 (i.e., ratio of correctly relevant video segments to video segments that are determined to be relevant in Dataset A is or approximately 0.9), C2 may correspond to a recall metric at 0.7 (i.e., ratio of video segments determined to be relevant to video segments that are actually relevant in Dataset A is or approximately 0.7), and C3 may correspond to a precision metric at 0.7 (i.e., ratio of correctly relevant video segments to video segments that are determined to be relevant in Dataset A is or approximately 0.7).

During the forward pass step, the training module 330 applies the adaptive thresholding model 520 to the query of each training instance to generate one or more estimated threshold values for the instance. The training module 330 computes a loss function 590 indicating a difference between the estimated thresholds and the relevance scores given by $R'_{C1}$, $R'_{C2}$, $R'_{C3}$ for the training instances. The training module 330 performs the backpropagation step to update the parameters of the adaptive thresholding model 520. This process is repeated until a convergence criterion is reached. In this manner, for a given query, the adaptive thresholding model 520 is trained to predict one or more filtering thresholds that likely correspond to different performance metrics for video segments in a dataset.

In this manner, the adaptive thresholding model can be trained to dynamically predict threshold values for the video retrieval model that takes into account the content and complexity of the user query as well as different target performance metrics. Moreover, the adaptive thresholding model herein can be trained using information that can be readily obtained from the training dataset of the video retrieval model or readily generated from the trained video retrieval model (e.g., relevance scores generated by the video retrieval model). Thus, in one embodiment, the video analysis system 130 may not have to separately obtain annotated training datasets from human operators or other sources to train the adaptive thresholding model.

Returning to FIG. 3, the retrieval module 335 receives requests from client devices 116 including one or more queries. The query may specify to retrieve relevant videos in a dataset. The retrieval module 335 performs inference by applying the video retrieval model to video segments of the dataset and the query to generate relevance scores for the query. The retrieval module 335 also applies the adaptive thresholding model to the user query to generate one or more predicted filtering thresholds. In one embodiment, the retrieval module 335 may apply the adaptive thresholding model 420 trained in conjunction with FIG. 4, in which the adaptive thresholding model 420 is configured to predict a filtering threshold value that targets to predict the relevance scores for relevant video segments to the query. In another embodiment, the retrieval module 335 may apply the adaptive thresholding model 520 trained in conjunction with FIG. 5, in which the adaptive thresholding model 520 is configured to predict different filtering threshold values that each target to predict the relevance scores for different performance metrics.

The retrieval module 335 may select and/or filter a set of video segments associated with relevance scores equal to or above the one or more predicted threshold values. In one instance, responsive to receiving the one or more predicted threshold values from the adaptive thresholding model, the retravel module 335 may calculate a range including the value (e.g., +/−5%, +/−10%, +/−20%) and select or filter the set of video segments that have relevance scores equal to or above the computed range as determined to be relevant to the query. The retrieval module 335 may provide the filtered set of video segments to the client device 116 of the request as a response.

Method of Retrieving Videos Using an Adaptive Thresholding Model

Figure 6:
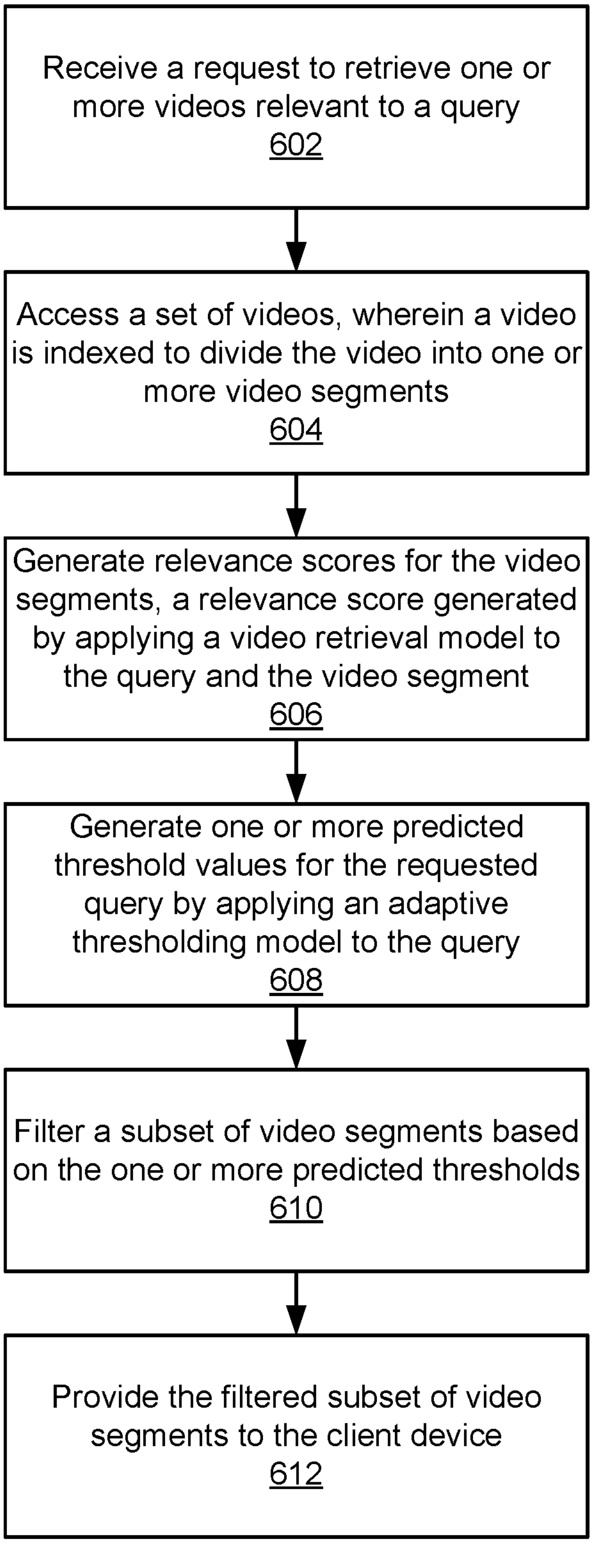
FIG. 6 illustrates a method of retrieving videos using an adaptive thresholding model, in accordance with an embodiment.

FIG. 6 illustrates a method of retrieving videos using an adaptive thresholding model, in accordance with an embodiment. The video analysis system 130 receives 602, from a client device, a request to retrieve one or more videos relevant to a query. The video analysis system 130 accesses 604 a set of videos. In one instance, a video in the set of videos is indexed to divide the video into one or more video segments. The video analysis system 130 generates 606 relevance scores for the video segments obtained from the set of videos. A relevance score for a respective video segment is generated by applying a machine-learned video retrieval model to the query and the video segment. The relevance score indicates a likelihood the video segment is related to the query. The video analysis system 130 generates 608 one or more predicted threshold values for the requested query. The one or more predicted threshold values are generated by applying a machine-learned adaptive thresholding model to the query. The subset of video segments are filtered 610 based on the one or more predicted thresholds. The subset of video segments are associated with relevance scores that are equal to or above a value obtained from the predicted thresholds. The video analysis system 130 provides 612 the filtered subset of video segments to the client device as being relevant to the query of the request.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of retrieving videos using an adaptive thresholding model, comprising:

receiving, from a client device, a request to retrieve one or more videos relevant to a query;

accessing a set of videos, wherein a video in the set of videos is indexed to divide the video into one or more video segments;

generating relevance scores for the video segments obtained from the set of videos, wherein a relevance score for a respective video segment is generated by applying a first machine-learned video retrieval model to the query and the video segment, and wherein the relevance score indicates a likelihood the video segment is related to the query;

generating one or more predicted threshold values for the requested query, wherein the one or more predicted threshold values are generated by applying a second machine-learned adaptive thresholding model to the query, wherein the first machine-learned video retrieval model and the second machine-learned adaptive thresholding model have separate sets of parameters, and wherein parameters of the adaptive thresholding model is trained by:

obtaining a training dataset including a set of instances including at least a previous query and a subset of video segments known to be relevant to the previous query, obtaining relevance scores generated for the subset of video segments using the first machine-learned video retrieval model, and training the parameters of the second machine-learned adaptive thresholding model using the training dataset obtained by applying the first machine-learned video retrieval model; and filtering a subset of video segments based on the one or more predicted threshold values, wherein the subset of video segments are associated with relevance scores that are equal to or above a value obtained from the predicted threshold values;

providing the filtered subset of video segments to the client device as being relevant to the query of the request;

receiving another request to retrieve videos relevant to another query different from the query;

generating one or more higher threshold values for the another query by applying the second machine-learned adaptive thresholding model to the another query; and providing another filtered subset of video segments as being relevant to the another query, wherein the another filtered subset of video segments are associated with relevance scores equal to or above a value obtained from the one or more higher threshold values.

2. The method of claim 1, wherein training the parameters further comprises:

generating estimated threshold values by applying the second adaptive thresholding model to the previous query; and computing a loss function indicating a difference between the estimated threshold values and the relevance scores generated for the subset of video segments; and backpropagating a value obtained from the loss function to update the parameters of the adaptive thresholding model.

3. The method of claim 1, wherein parameters of the first video retrieval model are trained by:

obtaining a training dataset including a set of instances including at least a previous query, a set of video segments, and labels for the set of video segments that each indicate whether a respective video segment is relevant to the previous query; and training the parameters of the first video retrieval model using the training dataset.

4. The method of claim 3, wherein obtaining the training dataset further comprises:

for the previous query, identifying one or more augmented queries from the previous query that each describe an object, person, or entity described in the previous query;

augmenting the training dataset by generating additional instances based on the augmented queries; and training the parameters of the first video retrieval model using at least the augmented instances of the training dataset.

5. The method of claim 1, wherein the second adaptive thresholding model is configured as a bidirectional encoding representations from transformer (BERT) architecture.

6. The method of claim 1, further comprising identifying one or more relevance scores each associated with a respective performance metric when used to filter the set of video segments.

7. A non-transitory computer-readable medium including instructions for execution on a processor, the instructions comprising:

receiving, from a client device, a request to retrieve one or more videos relevant to a query;

accessing a set of videos, wherein a video in the set of videos is indexed to divide the video into one or more video segments;

generating relevance scores for the video segments obtained from the set of videos, wherein a relevance score for a respective video segment is generated by applying a first machine-learned video retrieval model to the query and the video segment, and wherein the relevance score indicates a likelihood the video segment is related to the query;

generating one or more predicted threshold values for the requested query, wherein the one or more predicted threshold values are generated by applying a second machine-learned adaptive thresholding model to the query, wherein the first machine-learned video retrieval model and the second machine-learned adaptive thresholding model have separate sets of parameters, and wherein parameters of the adaptive thresholding model is trained by:

obtaining a training dataset including a set of instances including at least a previous query and a subset of video segments known to be relevant to the previous query, obtaining relevance scores generated for the subset of video segments using the first machine-learned video retrieval model, and training the parameters of the second machine-learned adaptive thresholding model using the training dataset obtained by applying the first machine-learned video retrieval model; and filtering a subset of video segments based on the one or more predicted threshold values, wherein the subset of video segments are associated with relevance scores that are equal to or above a value obtained from the predicted threshold values;

providing the filtered subset of video segments to the client device as being relevant to the query of the request;

receiving another request to retrieve videos relevant to another query different from the query;

generating one or more higher threshold values for the another query by applying the second machine-learned adaptive thresholding model to the another query; and providing another filtered subset of video segments as being relevant to the another query, wherein the another filtered subset of video segments are associated with relevance scores equal to or above a value obtained from the one or more higher threshold values.

8. The non-transitory computer-readable medium of claim 7, the instructions further comprising:

generating estimated threshold values by applying the adaptive thresholding model to the previous query; and computing a loss function indicating a difference between the estimated threshold values and the relevance scores generated for the subset of video segments; and backpropagating a value obtained from the loss function to update the parameters of the adaptive thresholding model.

9. The non-transitory computer-readable medium of claim 7, the instructions further comprising:

obtaining a training dataset including a set of instances including at least a previous query, a set of video segments, and labels for the set of video segments that each indicate whether a respective video segment is relevant to the previous query; and training the parameters of the first video retrieval model using the training dataset.

10. The non-transitory computer-readable medium of claim 9, wherein obtaining the training dataset further comprises:

for the previous query, identifying one or more augmented queries from the previous query that each describe an object, person, or entity described in the previous query;

augmenting the training dataset by generating additional instances based on the augmented queries; and training the parameters of the first video retrieval model using at least the augmented instances of the training dataset.

11. The non-transitory computer-readable medium of claim 7, wherein the second adaptive thresholding model is configured as a bidirectional encoding representations from transformer (BERT) architecture.

12. The non-transitory computer-readable medium of claim 7, the instructions further comprising:

identifying one or more relevance scores each associated with a respective performance metric when used to filter the set of video segments.

13. A computer system comprising:

a processor configured to execute instructions; and a non-transitory computer-readable medium containing the instructions for execution on the processor, the instructions causing the processor to perform steps of:

receiving, from a client device, a request to retrieve one or more videos relevant to a query;

accessing a set of videos, wherein a video in the set of videos is indexed to divide the video into one or more video segments;

generating relevance scores for the video segments obtained from the set of videos, wherein a relevance score for a respective video segment is generated by applying a first machine-learned video retrieval model to the query and the video segment, and wherein the relevance score indicates a likelihood the video segment is related to the query;

generating one or more predicted threshold values for the requested query, wherein the one or more predicted threshold values are generated by applying a second machine-learned adaptive thresholding model to the query, wherein the first machine-learned video retrieval model and the second machine-learned adaptive thresholding model have separate sets of parameters, and wherein parameters of the adaptive thresholding model is trained by:

obtaining a training dataset including a set of instances including at least a previous query and a subset of video segments known to be relevant to the previous query, obtaining relevance scores generated for the subset of video segments using the first machine-learned video retrieval model, and training the parameters of the second machine-learned adaptive thresholding model using the training dataset obtained by applying the first machine-learned video retrieval model; and filtering a subset of video segments based on the one or more predicted threshold values, wherein the subset of video segments are associated with relevance scores that are equal to or above a value obtained from the predicted threshold values;

providing the filtered subset of video segments to the client device as being relevant to the query of the request;

receiving another request to retrieve videos relevant to another query different from the query;

generating one or more higher threshold values for the another query by applying the second machine-learned adaptive thresholding model to the another query; and providing another filtered subset of video segments as being relevant to the another query, wherein the another filtered subset of video segments are associated with relevance scores equal to or above a value obtained from the one or more higher threshold values.

14. The computer system of claim 13, the instructions further causing the processor to perform the steps of:

generating estimated threshold values by applying the adaptive thresholding model to the previous query; and computing a loss function indicating a difference between the estimated threshold values and the relevance scores generated for the subset of video segments; and backpropagating a value obtained from the loss function to update the parameters of the adaptive thresholding model.

15. The computer system of claim 13, the instructions further causing the processor to perform the steps of:

obtaining a training dataset including a set of instances including at least a previous query, a set of video segments, and labels for the set of video segments that each indicate whether a respective video segment is relevant to the previous query; and training the parameters of the first video retrieval model using the training dataset.

16. The computer system of claim 15, wherein obtaining the training dataset further comprises:

for the previous query, identifying one or more augmented queries from the previous query that each describe an object, person, or entity described in the previous query;

augmenting the training dataset by generating additional instances based on the augmented queries; and training the parameters of the first video retrieval model using at least the augmented instances of the training dataset.

17. The computer system of claim 13, wherein the second adaptive thresholding model is configured as a bidirectional encoding representations from transformer (BERT) architecture.

* * * * *